(12) United States Patent
Kuang et al.

(10) Patent No.: US 6,603,215 B2
(45) Date of Patent: Aug. 5, 2003

(54) HYBRID ELECTRIC VEHICLE CONTROL STRATEGY WHILE TRAVELING IN REVERSE

(75) Inventors: Ming Lang Kuang, Canton, MI (US); Prabhakar B Patil, Southfield, MI (US); James Paul McCarthy, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/865,100

(22) Filed: May 24, 2001

(65) Prior Publication Data

US 2003/0001391 A1 Jan. 2, 2003

(51) Int. Cl.$^7$ .............................................. B60K 41/12
(52) U.S. Cl. .................................................... 290/40 C
(58) Field of Search ........................... 290/40 C, 40 B, 290/45; 180/65.2; 475/5

(56) References Cited

U.S. PATENT DOCUMENTS

| 5,343,970 A | | 9/1994 | Severinsky | |
| 5,722,502 A | * | 3/1998 | Kubo | 180/65.2 |
| 5,730,676 A | * | 3/1998 | Schmidt | 475/149 |
| 5,847,469 A | | 12/1998 | Tabata et al. | |
| 5,923,093 A | * | 7/1999 | Tabata et al. | 290/40 C |
| 5,934,395 A | * | 8/1999 | Koide et al. | 180/65.2 |
| 6,018,694 A | * | 1/2000 | Egami et al. | 180/65.2 |
| 6,054,844 A | * | 4/2000 | Frank | 180/65.2 |
| 6,137,250 A | * | 10/2000 | Hirano et al. | 180/65.2 |
| 6,249,723 B1 | * | 6/2001 | Lutz | 701/22 |
| 6,269,290 B1 | * | 7/2001 | Egami et al. | 290/45 |
| 6,306,057 B1 | * | 10/2001 | Morisawa et al. | 475/5 |
| 6,378,638 B1 | * | 4/2002 | Mizon et al. | 180/65.2 |
| 6,380,640 B1 | * | 4/2002 | Kanamori et al. | 290/40 C |
| 6,409,623 B1 | * | 6/2002 | Hoshiya et al. | 475/5 |

FOREIGN PATENT DOCUMENTS

| DE | 4342735 A1 | * | 6/1995 | ............ B60K/6/02 |
| JP | 2000045813 A | * | 2/2000 | |
| JP | 2000207816 A | * | 3/2002 | |

* cited by examiner

Primary Examiner—Joseph Waks
(74) Attorney, Agent, or Firm—Carlos L. Hanze

(57) ABSTRACT

A method for reverse drive mode operation of a hybrid electric vehicle includes determining an output power of the internal combustion engine, determining a power circulation loss between a generator and a motor, determining a benefit power based on the difference between the output power of the internal combustion engine and the power circulation loss, and stopping operation of the internal combustion engine during the reverse drive mode operation of the vehicle if the benefit power is less than a predetermined threshold power value.

5 Claims, 3 Drawing Sheets

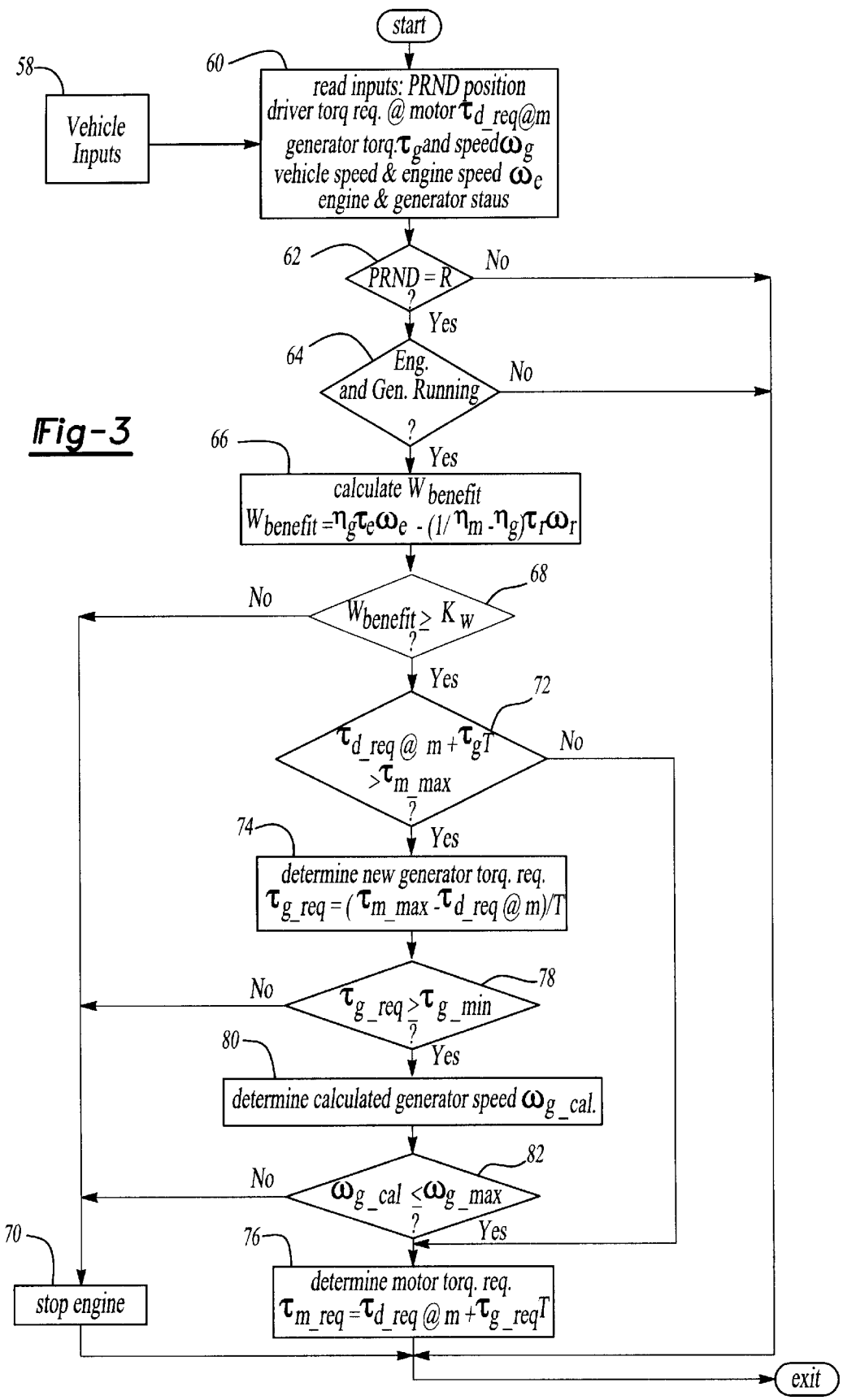

HYBRID ELECTRIC VEHICLE CONTROL STRATEGY WHILE TRAVELING IN REVERSE

BACKGROUND OF THE INVENTION

1. Field of the Invention

The present invention relates generally to a hybrid electric vehicle (HEV), and specifically to a strategy to control a split powertrain HEV while the vehicle travels in reverse and vehicle state-of-charge (SOC) is low.

2. Discussion of the Prior Art

The need to reduce fossil fuel consumption and emissions in automobiles and other vehicles predominately powered by internal combustion engines (ICEs) is well known. Vehicles powered by electric motors attempt to address these needs. Another alternative solution is to combine a smaller ICE with electric motors into one vehicle. Such vehicles combine the advantages of an ICE vehicle and an electric vehicle and are typically called hybrid electric vehicles (HEVs). See generally, U.S. Pat. No. 5,343,970 to Severinsky.

The HEV is described in a variety of configurations. Many HEV patents disclose systems where an operator is required to select between electric and internal combustion operation. In other configurations, the electric motor drives one set of wheels and the ICE drives a different set.

Other, more useful, configurations have developed. For example, a series hybrid electric vehicle (SHEV) configuration is a vehicle with an engine (most typically an ICE) connected to an electric motor called a generator. The generator, in turn, provides electricity to a battery and another electric motor, called a traction motor. In the SHEV, the traction motor is the sole source of wheel torque. There is no mechanical connection between the engine and the drive wheels. A parallel hybrid electrical vehicle (PHEV) configuration has an engine (most typically an ICE) and an electric motor that work together in varying degrees to provide the necessary wheel torque to drive the vehicle. Additionally, in the PHEV configuration, the motor can be used as a generator to charge the battery from the power produced by the ICE.

A parallel/series hybrid electric vehicle (PSHEV) has characteristics of both PHEV and SHEV configurations and is sometimes referred to as a "powersplit" configuration. In one of several types of PSHEV configurations, the ICE is mechanically coupled to two electric motors in a planetary gear-set transaxle. A first electric motor, the generator, is connected to a sun gear. The ICE is connected to a carrier gear. A second electric motor, a traction motor, is connected to a ring (output) gear via additional gearing in a transaxle. Engine torque can power the generator to charge the battery. The generator can also contribute to the necessary wheel (output shaft) torque if the system has a one-way clutch. The traction motor is used to contribute wheel torque and to recover braking energy to charge the battery. In this configuration, the generator can selectively provide a reaction torque that may be used to control engine speed. In fact, the engine, generator motor and traction motor can provide a continuous variable transmission (CVT) effect. Further, the HEV presents an opportunity to better control engine idle speed over conventional vehicles by using the generator to control engine speed.

The desirability of combining an ICE with electric motors is clear. There is great potential for reducing vehicle fuel consumption and emissions with no appreciable loss of vehicle performance or drive-ability. The HEV allows the use of smaller engines, regenerative braking, electric boost, and even operating the vehicle with the engine shutdown. Nevertheless, new ways must be developed to optimize the HEV's potential benefits.

One such area of HEV development is controlling a powersplit HEV while traveling in reverse. In the prior art, a reverse gear in a transmission is engaged when the vehicle operator moves a shift lever to the reverse, or "R", position. In an HEV, a variety of powertrain configurations based on vehicle conditions can require new strategies to move the vehicle in reverse.

A strategy for moving an HEV in reverse is known in the prior art. See U.S. Pat. No. 5,847,469 to Tabata et al. Tabata et al. describes an HEV using a conventional transmission to power the vehicle's wheels. The patent describes a system for the electric traction motor alone to reverse the direction of the vehicle without reversing the rotation of the motor so long as there is enough battery charge. Otherwise, the engine is started to assist the motor.

A conventional transmission with a reverse gear could be considered an inefficient and unnecessary complication and expense in a split powertrain HEV. Alternatively, the electric traction motor alone is used to propel the vehicle in reverse direction. When moving in reverse, the ring gear torque, resulting from engine output, goes against the vehicle moving in reverse. Thus, using the engine while the vehicle is in reverse is undesirable. Nevertheless, if battery state-of-charge (SOC) is low, the engine may need to run to power a generator to charge the battery and allow the motor to operate.

Unfortunately, no strategy is known to control a split powertrain HEV while the vehicle travels in reverse with the engine running because the battery state-of-charge (SOC) is low and the electric traction motor requires electricity produced by the generator for reverse motive power.

SUMMARY OF THE INVENTION

Accordingly, an object of the present invention is to provide a strategy to control a split powertrain hybrid electric vehicle (HEV) when the vehicle travels in reverse, vehicle state-of-charge (SOC) is low and the powertrain is configured to only use the motor while traveling in reverse.

The powersplit hybrid electric vehicle (HEV) powertrain of the present invention has an engine, a traction motor, a generator, an electric energy storage device for storing electric energy, the electric energy storage device connected to the traction motor to power the traction motor, and the electric energy storage device connected to the generator to receive energy generated by the generator. The powersplit HEV powertrain also has a power transmission device having at least one forward drive position to move the HEV in a forward direction and at least one reverse drive position to move the vehicle in a reverse direction. The power transmission device is connected to the engine, the traction motor, and the generator motor. In addition, the powersplit HEV powertrain has a driver operated drive position selector comprising a reverse drive mode, a vehicle system controller comprising a reverse drive mode controller activated when the drive position selector is in the reverse drive mode, wherein the reverse drive mode controller preventing the battery SOC from continuously falling while meeting driver demand.

The powertrain reverse drive mode controller can be configured to determine whether the engine and generator motor are running, calculate a benefit power from the engine if the engine and the generator motor are running, compare the benefit power with a first predetermined value, determine whether a driver torque request plus the generator torque is greater than a predetermined maximum motor torque if the benefit power is greater than or equal to the first predetermined value, calculate a new generator torque request if the determination of whether a driver torque request plus the generator torque is greater than a predetermined maximum motor torque, determine whether the new generator torque request is greater than or equal to a second predetermined value, calculate a new generator speed for the new generator torque request if the new generator torque request is greater than or equal to the second predetermined value, determine whether the new generator speed is less than or equal to a maximum generator speed, and determine a new motor torque request if the new generator speed is less than or equal to a maximum generator speed.

The controller can also be configured to add a stop engine command if the benefit power is less than the first predetermined value, the new generator torque request is less than the second predetermined value, or the new generator speed is greater than a maximum generator speed.

Other objects of the present invention will become more apparent to persons having ordinary skill in the art to which the present invention pertains from the following description taken in conjunction with the accompanying figures.

BRIEF DESCRIPTION OF THE FIGURES

The foregoing objects, advantages, and features, as well as other objects and advantages, will become apparent with reference to the description and figures below, in which like numerals represent like elements and in which:

FIG. 3 illustrates the strategy of the present invention for an HEV while traveling in reverse.

DETAILED DESCRIPTION OF THE PREFERRED EMBODIMENT

Figure 1:
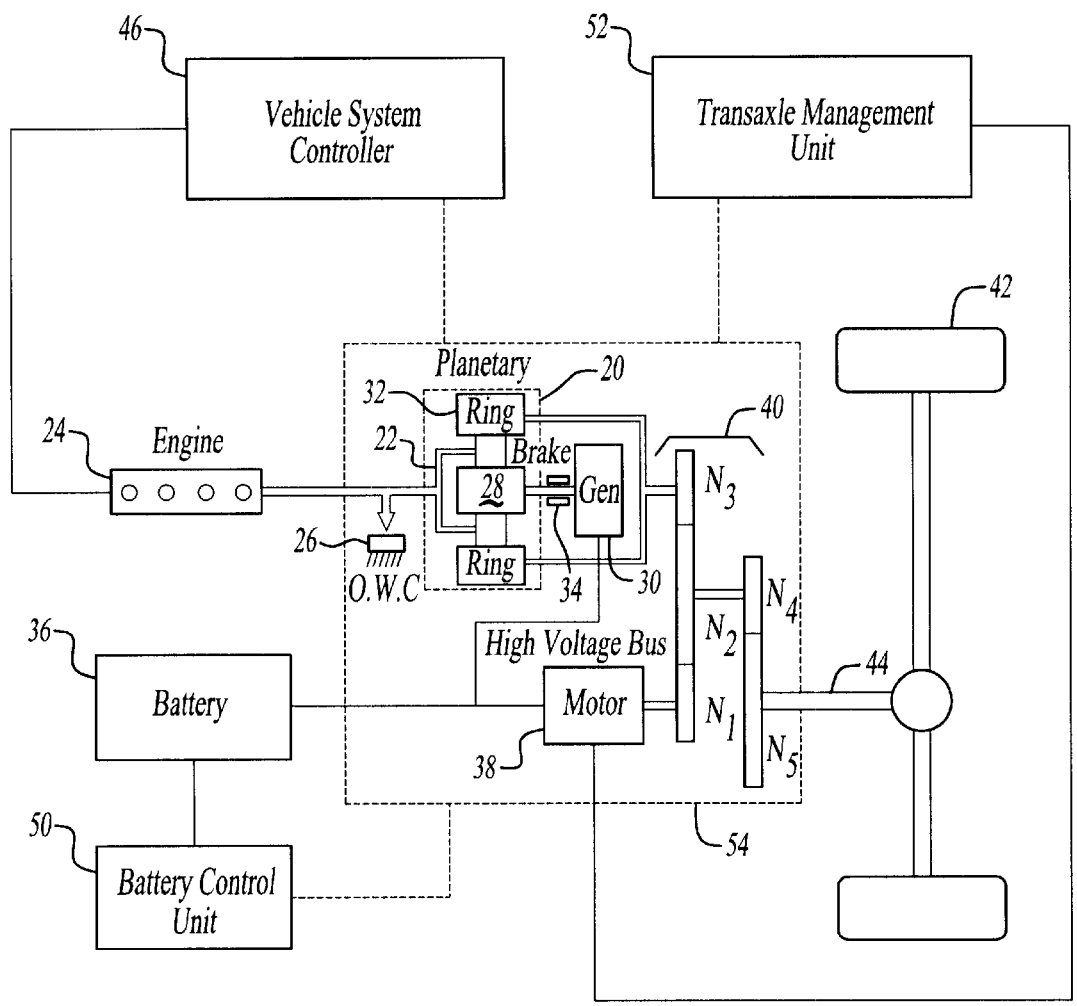
FIG. 1 illustrates a general hybrid electric vehicle (HEV) configuration.

The present invention relates to electric vehicles and, more particularly, to hybrid electric vehicles (HEVs). FIG. 1 demonstrates just one possible configuration, specifically a parallel/series hybrid electric vehicle (powersplit) configuration.

In a basic HEV, a planetary gear set 20 mechanically couples a carrier gear 22 to an engine 24 with a one-way clutch 26 to prevent the engine from rotating in a counter clock wise (CCW) direction. The planetary gear set 20 also mechanically couples a sun gear 28 to a generator motor 30 and a ring (output) gear 32. The generator motor 30 also mechanically links to a generator brake 34 and is electrically linked to an electric energy storage device (battery) 36 to receive electric energy converted from mechanical energy by the generator motor 30. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44. The mechanical coupling represents collectively a power transmission device, the power transmission devise being connected to the engine 24, the traction motor 38 and the generator motor 30. This power transmission device can be configured to have at least one forward drive position to move the HEV in a forward direction and at least one reverse drive position to move the HEV in a reverse direction. A driver operated drive position selector (gear selector) (not shown) determines whether the vehicle is to move in the reverse direction.

The planetary gear set 20, splits the engine 24 output energy into a series path from the engine 24 to the generator motor 30 and a parallel path from the engine 24 to the drive wheels 42. Engine 24 speed can be controlled by varying the split to the series path while maintaining the mechanical connection through the parallel path. The traction motor 38 augments the engine 24 power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine 24 energy, minus conversion losses, to reach the drive wheels 42.

A vehicle system controller (VSC) 46 controls many components in this HEV configuration by connecting to each component's controller. An engine control unit (ECU) (not shown) connects to the engine 24 via a hardwire interface. The ECU and VSC 46 can be based in the same unit, but are actually separate controllers. The VSC 46 communicates with the ECU, as well as a battery control unit (BCU) 50 and a transaxle management unit (TMU) 52 through a communication network such as a controller area network (CAN) 54. The BCU 50 connects to the battery 36 via a hardwire interface. The TMU 52 controls the generator motor 30 and traction motor 38 via a hardwire interface.

All vehicles require movement in a reverse direction from time to time. Such movement usually begins with a driver manually shifting a gear selector to a reverse (or "R") position. In the powertrain configuration of the present invention, the engine 24 does not provide primary drive to the vehicle while traveling in reverse. There is no true rear drive shifting means in that there is no discrete exchange of power flow elements that produces a reverse range as opposed to a forward range. In fact, torque from the engine 24 while in reverse would work against the traction motor 38 traveling in reverse. Nevertheless, to operate the traction motor 38 in a reverse rotation, the engine 24 may be needed to charge the battery 36 if a low state-of-charge (SOC) exists. During engine 24 operation to generate the electricity, the engine 24 would produce torque through the second gear set 40 that would attempt to drive the vehicle in a forward direction. It is only by the balance of the relative forward and reverse torques that the net vehicle rearward torque is augmented.

Figure 2:
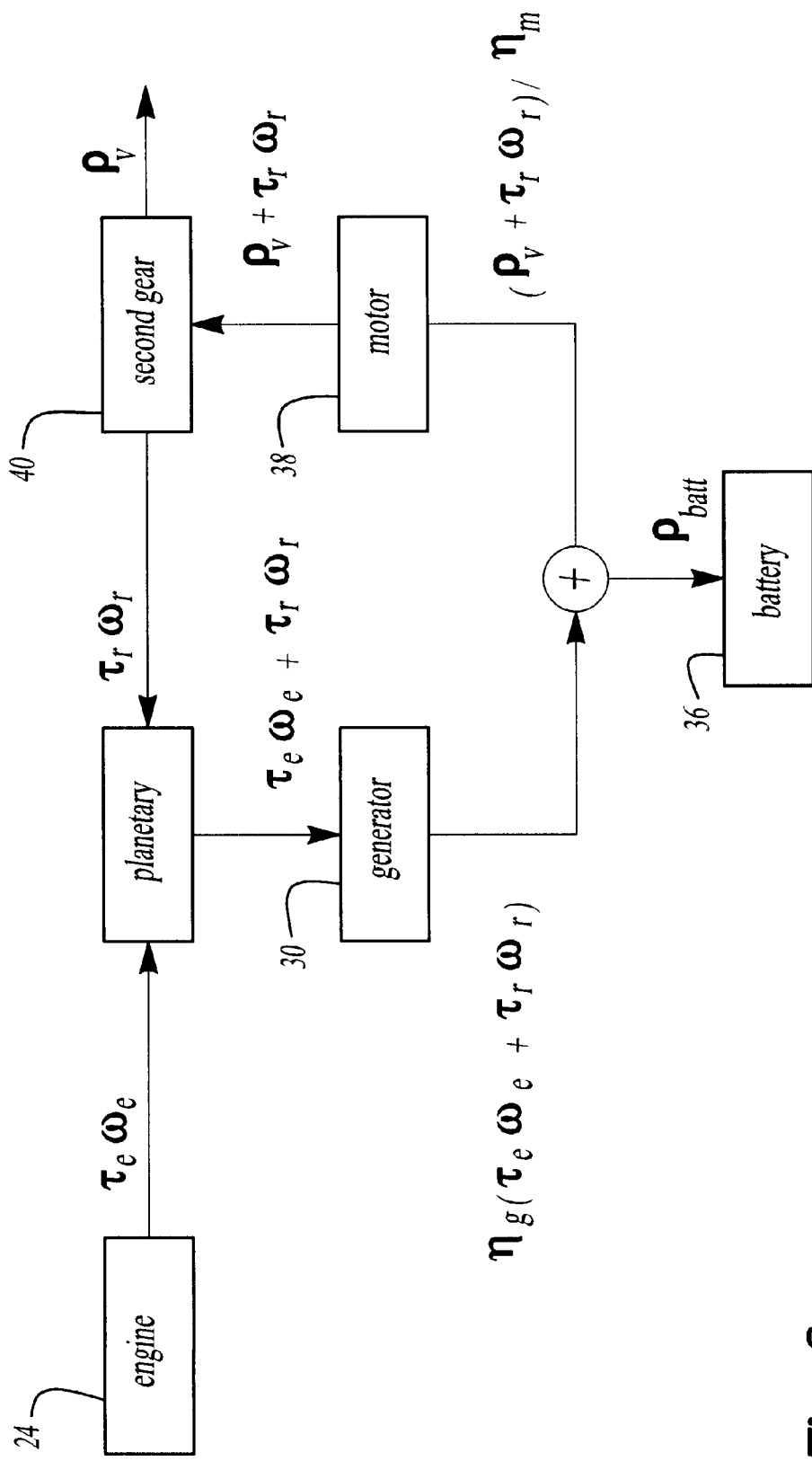
FIG. 2 illustrates the power flow within the powertrain.

For example, if the vehicle is moving in reverse at a certain vehicle speed (equivalent to $\omega_r$), the traction motor's 38 output power required for the vehicle speed is $P_V$. Also assume the engine 24 is running at a constant power output ($\tau_e \omega_e$), and both efficiencies of the planetary gear set 20 and the second gear set 40 are one. The resulted ring output gear 32 torque from the engine 24 torque ($\tau_e$) is $\tau_r = \tau_e/(1+\rho)$. $\rho$ is the gear ratio between the sun gear 28 and the ring gear 32 ($N_s/N_r$). $\eta_g$ and $\eta_m$ are the efficiencies for the generator motor and the traction motor respectively. The power flow within the powertrain under these assumptions is illustrated in FIG. 2. The following symbols listed below will assist in understanding the present invention:

| | |
|---|---|
| $\omega_r =$ | ring gear speed |
| $\omega_e =$ | engine speed |
| $P_v =$ | output power |
| $\tau_e\omega_e =$ | engine power output |
| $\tau_e =$ | engine torque |
| $\tau_r =$ | ring gear torque |
| $\rho =$ | gear ratio between sun gear and ring gear |
| Ns = | number of teeth in sun gear |
| Nr = | number of teeth in ring gear |
| $\eta_g =$ | overall efficiency for generator |
| $\eta_m =$ | overall efficiency for motor |
| $P_{batt} =$ | power charging the battery |
| $\eta_g\tau_e\omega_e =$ | engine's electrical output power (through generator) |
| $P_v/\eta_m =$ | motor's input power (electrical) |
| $(1/\eta_m - \eta_g)\tau_r\omega_r =$ | power circulation loss between motor and generator |
| $\tau_{d\text{—}req@m} =$ | driver's torque request at the motor |
| $\tau_g =$ | generator torque |
| $\omega_g =$ | generator speed |
| $W_{benefit} =$ | benefit power from the engine |
| $K_w =$ | a predetermined $W_{benefit}$ value |
| $\tau_{m\text{—}max} =$ | maximum motor torque |
| $\tau_{g\text{—}req} =$ | generator torque request |
| $\tau_{g\text{—}min} =$ | generator torque request minimum |
| $\omega_{g\text{—}cal} =$ | calculated generator speed |
| $\omega_{g\text{—}max} =$ | maximum generator speed. |
| T = | gear ratio from generator to motor |

The power flow illustrated in FIG. 2 demonstrates part of the traction motor 38 output ($\tau_r\omega_r$ required to overcome the engine 24 output at the ring gear 32) is also part of the generator motor 30 input, which generates electricity. Clearly, this is a power circulation between the traction motor 38 and the generator motor 30, which results in power circulation loss in the powertrain system.

The power charging the battery 36 is $P_{batt}$ and is shown by:

$$P_{batt}=\eta_g(\tau_e\omega_e+\tau_r\omega_r)-(P_v+\tau_r\omega_r)/\eta_m, \text{ or}$$

$$P_{batt}=\eta_g\tau_e\omega_e-P_v/\eta_m-(1/\eta_m-\eta_g)\tau_r\omega_r.$$

In this example, $\eta_g\tau_e\omega_e$ is the engine's 24 electrical output power (through the generator motor 30), $P_v/\eta_m$ is the traction motor's 38 input power (electrical) required to propel the vehicle, and $(1/\eta_m-\eta_g)\tau_r\omega_r$ is the power circulation loss between the traction motor 38 and generator motor 30. If the power circulation loss is greater than or close to the engine's 24 electrical output power, there is no benefit to operate the engine 24 since the engine 24 output only generates heat in the traction motor 38 and generator motor 30, and does not charge the battery 36.

To ensure the benefit of operating the engine 24 when the vehicle travels in reverse and the battery 36 SOC is low, it is necessary for the VSC 46 to control the powertrain system properly to avoid the result illustrated above.

The present invention is a control strategy within the VSC 46 to efficiently control the illustrated powersplit HEV powertrain system when the vehicle travels in reverse and the battery 36 SOC is low. The reverse drive mode controller is activated when the drive position selector is in the reverse drive mode. The present invention operates the powertrain system efficiently and prevents the battery 36 SOC from continuously falling while meeting the driver's demand. The strategy is illustrated in FIG. 3.

At Step 60, the reverse drive mode controller strategy first reads the following vehicle inputs 58: PRND position, driver's torque request at the motor ($\tau_{d\_req@m}$), generator torque ($\tau_g$) and speed ($\omega_g$), vehicle speed (to calculate ring gear speed $\omega_r$), engine speed ($\omega_e$), and engine and generator status. PRND position represents a driver operated drive position selector, or gear selector, (not shown) that is manually shifted by the vehicle driver. If the gear selector is in the "R" position, the driver has requested the vehicle to move in reverse.

At Step 62, the strategy next determines if the gear selector is in the "R" position. If no, the strategy ends.

If "R" is selected at Step 62, the strategy next determines if both the engine 24 and generator motor 30 are running at Step 64. If no, the strategy ends. If both the engine 24 and generator motor 30 are running at Step 64, the strategy calculates the benefit power from the engine 24 $W_{benefit}$ at Step 66 using the equation $W_{benefit}=\eta_g\tau_e\omega_e-(1/\eta_m-\eta_g)\tau_r\omega_r$.

Next the strategy determines at Step 68 whether the $W_{benefit}$ is greater than or equal to a first predetermined value $K_w$. This value indicates it is desirable to run the engine 24 to charge the battery 36.

If $W_{benefit}$ is greater than or equal to $K_w$ at Step 68, the strategy next determines at Step 72 whether the sum of the driver's torque request at motor($\tau_{d\_req@m}$) plus the generator motor 30 torque reflected at the motor shaft ($\tau_gT$, where T is the gear ratio from generator to motor and is well known in the prior art) is greater than the predetermined maximum motor torque ($\tau_{m\_max}$) If the $W_{benefit}$ is less than $K_w$, the strategy executes a stop engine process at Step 70 and ends the strategy.

If the sum is greater than the predetermined maximum motor torque at Step 72, the strategy calculates a new generator motor 30 torque request ($\tau_{g\_req}$) at Step 74 so that the driver's torque request is not compromised and the vehicle reverse acceleration performance meets driver demand. The calculation is as follows: $\tau_{g\_req}=(\tau_{m\_max}-\tau_{d\_req@m})/T$. Otherwise, the strategy proceeds to calculate a new traction motor 38 torque request ($\tau_{m\_req}$) at Step 76 using: $\tau_{m\_req}=\tau_{d\_req@m}+\tau_{g\_req}T$ and the strategy ends.

Next, the strategy determines at Step 78 whether the new generator motor 30 torque request ($\tau_{g\_req}$) is greater than or equal to a second predetermined value ($\tau_{g\_min}$). This implies the generator motor's 30 torque can be accurately controlled. If ($\tau_{g\_req}$) is greater than or equal to the second predetermined value ($\tau_{g\_min}$) at Step 78, the strategy proceeds to determine the calculated generator motor 30 speed ($\omega_{g\_cal}$) for the given new generator motor 30 torque request at Step 80. Otherwise, the strategy proceeds to execute the stop engine process at Step 70 and ends the strategy. With the new generator motor 30 torque request ($\tau_{g\_req}$), a new engine 24 speed ($\omega_e$) can be determined and then the calculated generator motor 30 speed ($\omega_{g\_cal}$) of Step 80 can be derived based on the new engine 24 speed and ring gear 32 speed (equivalent to present vehicle speed).

Next, at Step 82, the strategy determines whether the calculated generator motor 30 speed ($\omega_{g\_cal}$) is less than or equal to a predetermined maximum generator motor 30 speed ($\omega_{g\_max}$). If yes, the strategy proceeds to Step 76 (described above) to determine the new traction motor 38 torque request to meet the driver's demand. This motor torque request compensates the ring gear 32 torque resulted from the engine 24 output to meet the driver's demand. If the calculated generator motor 30 speed ($\omega_{g\_cal}$) is greater than the maximum generator motor 30 speed ($\omega_{g\_max}$) at Step 82, the strategy proceeds to execute the stop engine process at Step 70 and the strategy ends.

The above-described embodiment of the invention is provided purely for purposes of example. Many other variations, modifications, and applications of the invention may be made.

We claim:

1. A method for reverse drive mode operation of a hybrid electric vehicle, the hybrid electric vehicle having a traction motor and an operating internal combustion engine and operating generator mechanically coupled via a power transmission device, the method comprising:

determining an output power of the internal combustion engine;

determining a power circulation loss between the generator and the motor;

determining a benefit power based on the difference between the output power of the internal combustion engine and the power circulation loss; and stopping operation of the internal combustion engine during the reverse drive mode operation of the vehicle if the benefit power is less than a predetermined threshold power value.

2. The method according to claim 1, wherein if the benefit power is greater than or equal to the predetermined threshold power value, the method further comprises:

determining a driver torque request at the motor;

determining a generator torque reflected at the motor;

summing the driver torque request and the generator torque reflected at the motor;

comparing the sum of the driver torque request and the generator torque reflected at the motor to a maximum motor torque;

determining a new generator torque request if the sum of the driver torque request and the generator torque reflected at the motor is greater than the maximum motor torque, the new generator torque request being based at least in part on a difference between a maximum motor torque and the driver torque request at the motor; and determining a new motor torque request if the sum of the driver torque request and the generator torque reflected at the motor is less than or equal to the maximum motor torque, the new motor torque request being based at least in part on a sum of the driver torque request at the motor and a requested generator torque reflected at the motor.

3. The method according to claim 2, further comprising:

comparing the new generator torque request to a generator torque request minimum; and stopping operation of the internal combustion engine if the new generator torque request is less than the generator torque request minimum.

4. The method according to claim 2, further comprising:

comparing the new generator torque request to a generator torque request minimum;

calculating a generator speed based at least on a speed of the internal combustion engine and a speed of the vehicle;

comparing the calculated generator speed to a maximum generator speed; and stopping operation of the internal combustion engine if the calculated generator speed is greater than the maximum generator speed.

5. The method according to claim 4, further comprising the step of determining the new traction motor torque request if the calculated generator speed is less than or equal to the maximum generator speed.

* * * * *